(12) United States Patent
Kim et al.

(10) Patent No.: US 10,063,756 B2
(45) Date of Patent: Aug. 28, 2018

(54) CAMERA MODULE AND MOBILE TERMINAL HAVING THE SAME

(71) Applicant: LG ELECTRONICS INC., Seoul (KR)

(72) Inventors: Jongpil Kim, Seoul (KR); Byunghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/373,135

(22) Filed: Dec. 8, 2016

(65) Prior Publication Data
US 2017/0353634 A1    Dec. 7, 2017

(30) Foreign Application Priority Data

Jun. 7, 2016    (KR) .................. 10-2016-0070471

(51) Int. Cl.
*H04N 5/225*    (2006.01)
*G02B 7/08*    (2006.01)
(Continued)

(52) U.S. Cl.
CPC ........... *H04N 5/2254* (2013.01); *G02B 5/005* (2013.01); *G02B 7/08* (2013.01); *H04N 5/2252* (2013.01);
(Continued)

(58) Field of Classification Search
CPC .. H04N 5/2251; H04N 5/2254; H04N 5/2257; H04N 5/23241; H04L 41/0246;
(Continued)

(56) References Cited

U.S. PATENT DOCUMENTS 8,477,239 B2 * 7/2013 Kale ................. H01L 27/14618
257/680
8,664,579 B2 * 3/2014 Olsen ................... G02B 3/0062
250/208.1
(Continued)

FOREIGN PATENT DOCUMENTS

JP    7-56076 A    3/1995
JP    2012-3022 A    1/2012
(Continued)

*Primary Examiner* — Lin Ye
*Assistant Examiner* — Chriss Yoder, III
(74) *Attorney, Agent, or Firm* — Birch, Stewart, Kolasch & Birch, LLP

(57) ABSTRACT

Provided are a camera module and a mobile terminal having the same. The camera module includes a first lens assembly, a second lens assembly disposed to be adjacent to the first lens assembly, a lens cover accommodating the first and second lens assemblies and having first and second through holes allowing light to be incident to the first and second lens assemblies, an actuator provided on one side of the first and second lens assemblies to drive the first and second lens assemblies, one image sensor disposed below the first and second lens assemblies and converting light signals incident through the first and second lens assemblies into first and second image signals, and a camera case having a through hole formed on a front side thereof and accommodating the lens cover to allow light to be incident to the first and second lens assemblies through the through hole.

20 Claims, 13 Drawing Sheets

(51) Int. Cl.
    *G02B 5/00* (2006.01)
    *H04N 5/262* (2006.01)
    *H04N 5/232* (2006.01)

(52) U.S. Cl.
    CPC ......... *H04N 5/2253* (2013.01); *H04N 5/2257* (2013.01); *H04N 5/23229* (2013.01); *H04N 5/2628* (2013.01)

(58) Field of Classification Search
    CPC ........... H04L 41/0273; H01L 27/14625; H01L 27/14634; H01L 29/66977; G02B 13/06; G02B 13/18; G02B 7/003; G02B 7/02; G02B 7/021; G02F 2201/305; G03B 37/04; G06T 3/4038
    See application file for complete search history.

(56) References Cited

U.S. PATENT DOCUMENTS

| | | | | |
|---|---|---|---|---|
| 8,767,068 B2* | 7/2014 | Imamura | ............ | G01C 3/085 348/135 |
| 8,767,190 B2* | 7/2014 | Hall | ............ | G01S 7/4813 356/3.01 |
| 9,083,873 B1* | 7/2015 | Lewkow | ............ | G02B 7/021 |
| 9,531,954 B2* | 12/2016 | Dong | ............ | H04N 5/23287 |
| 2003/0086013 A1* | 5/2003 | Aratani | ............ | A63F 13/06 348/335 |
| 2005/0128509 A1* | 6/2005 | Tokkonen | ............ | H04N 9/045 358/1.15 |
| 2011/0128393 A1* | 6/2011 | Tavi | ............ | H04N 5/2257 348/218.1 |
| 2013/0287383 A1* | 10/2013 | Haruguchi | ............ | G03B 3/10 396/133 |
| 2015/0316744 A1* | 11/2015 | Chen | ............ | H04N 5/247 359/824 |
| 2016/0154198 A1* | 6/2016 | Alasimio | ............ | G03B 17/02 348/335 |
| 2016/0182821 A1* | 6/2016 | Shabtay | ............ | H04N 5/2258 348/239 |

FOREIGN PATENT DOCUMENTS

KR       10-0847849 B1     7/2008
KR       10-2011-0135502 A   12/2011

* cited by examiner

CAMERA MODULE AND MOBILE TERMINAL HAVING THE SAME

CROSS-REFERENCE TO RELATED APPLICATION

Pursuant to 35 U.S.C. § 119(a), this application claims the benefit of earlier filing dates and rights of priority to Korean Application No. 10-2016-0070471, filed on Jun. 7, 2016, the contents of which are incorporated by reference herein in its entirety.

BACKGROUND OF THE INVENTION

1. Field of the Invention

The present disclosure relates to a camera module having a pair of lens assemblies and a mobile terminal having the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Meanwhile, when mobile terminal has a dual-camera and two lenses and two image sensors are provided, time axes and optical axes of images received respectively from the lenses are required to be corrected. Here, during a correction process, the images may be distorted or processing thereof may be complicated.

SUMMARY OF THE INVENTION

Therefore, an aspect of the detailed description is to provide a camera module including two lens assemblies and one image sensor.

To achieve these and other advantages and in accordance with the purpose of this specification, as embodied and broadly described herein, a camera module includes: a first lens assembly; a second lens assembly disposed to be adjacent to the first lens assembly; a lens cover accommodating the first and second lens assemblies and having first and second through holes allowing light to be incident to the first and second lens assemblies; an actuator provided on one side of the first and second lens assemblies to drive the first and second lens assemblies; one image sensor disposed below the first and second lens assemblies and converting light signals incident through the first and second lens assemblies into first and second image signals; and a camera case having a through hole formed on a front side thereof and accommodating the lens cover to allow light to be incident to the first and second lens assemblies through the through hole, wherein portions of mutually adjacent regions of the first and second lens assemblies are cut so that the first lens assembly has a first cut surface and the second lens assembly has a second cut surface, and the first and second cut surfaces are in contact with each other or spaced apart from each other at a predetermined interval and disposed to face each other.

According to an aspect of the present disclosure, when configurations of the first and second lens assemblies are the same, the first and second cut surfaces may be in contact with each other.

According to an aspect of the present disclosure, the actuator may be one actuator or two actuators.

According to an aspect of the present disclosure, when configurations of the first and second lens assemblies are different, the first and second cut surfaces may be spaced apart from each other at a predetermined interval and disposed to face each other, a partition may be formed in the camera case to divide the through hole into a third through hole and a fourth through hole, and the first and second lens assemblies may be exposed outwardly through the third and fourth through holes.

According to an aspect of the present disclosure, the actuator may include a first actuator disposed to be adjacent to the first lens assembly to drive the first lens assembly; and a second actuator disposed to be adjacent to the second lens assembly to drive the second lens assembly.

According to an aspect of the present disclosure, the image sensor may have a rectangular shape with a longer side and a shorter side, and the first and second cut surfaces may be surfaces formed to be adjacent to at least one of the longer side and the shorter side of the rectangular shape.

According to an aspect of the present disclosure, the first and second lens assemblies may have a D shape.

According to an aspect of the present disclosure, the first image signal and the second image signal may be cropped to synthesize a single image.

According to an aspect of the present disclosure, a distance between an optical axis of the first lens assembly and an optical axis of the second lens assembly may be smaller than a preset size.

According to an aspect of the present disclosure, a field of view (FOV) of the single image may be smaller than the sum of a first FOV of the first lens assembly and a second FOV of the second lens assembly.

According to an aspect of the present disclosure, the lens cover may have a single structure.

According to an aspect of the present disclosure, the camera module may further include: a circuit board provided below the image sensor and electrically connected to the image sensor; and a flexible circuit board having one end portion connected to the circuit board and the other end portion in which a connector is formed.

To achieve these and other advantages and in accordance with the purpose of this specification, as embodied and broadly described herein, a mobile terminal includes: a terminal body; and a camera module formed on one surface of the terminal body, wherein the camera module includes: a plurality of lens assemblies disposed to be adjacent to each other; a lens cover accommodating the plurality of lens assemblies and having through holes allowing light to be incident to the plurality of lens assemblies; an actuator provided on one side of the plurality of lens assemblies to drive the plurality of lens assemblies; one image sensor disposed below the plurality of lens assemblies and converting light signals incident through the plurality of lens assemblies into image signals; and a camera case having a through hole formed on a front side thereof and accommodating the lens cover to allow light to be incident to the plurality of lens assemblies through the through hole, wherein portions of mutually adjacent regions of the plurality of lens assemblies are cut so that the plurality of lens assemblies each have a cut surface, and the cut surfaces are in contact with each other or spaced apart from each other at a predetermined interval and disposed to face each other.

According to an aspect of the present disclosure, when configurations of the plurality of lens assemblies are the same, the cut surfaces may be in contact with each other.

According to an aspect of the present disclosure, when configurations of the plurality of lens assemblies are different, the cut surfaces may be spaced apart from each other at a predetermined interval and disposed to face each other and a partition may be formed in the camera case to divide the interior thereof.

According to an aspect of the present disclosure, the image sensor may have a rectangular shape with a longer side and a shorter side, and the cut surfaces may be surfaces formed to be adjacent to at least one of the longer side and the shorter side of the rectangular shape.

According to an aspect of the present disclosure, the cut surfaces may be formed to be adjacent to the longer sides facing each other.

According to an aspect of the present disclosure, the actuator may be one or more actuators.

According to an aspect of the present disclosure, when the actuator is provided in plurality, the plurality of actuators may independently operate.

According to an aspect of the present disclosure, each of the lens assemblies may have a D shape or a quadrant shape.

The camera module and the mobile terminal having the same have the following advantages.

According to at least one of the embodiments of the present disclosure, since images based on an incident light incident through the two lens assemblies are processed by one image sensor, an image processing process can be performed rapidly and a time axis correction may be omitted.

According to at least one of the embodiments of the present disclosure, since two lens assemblies are D-cut, an interval between the lens assemblies may be reduced, and thus, a volume of the camera module may be reduced.

According to at least one of the embodiments of the present disclosure, by synthesizing fields of view of two lens assemblies, a wide angle may be implemented without distortion.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
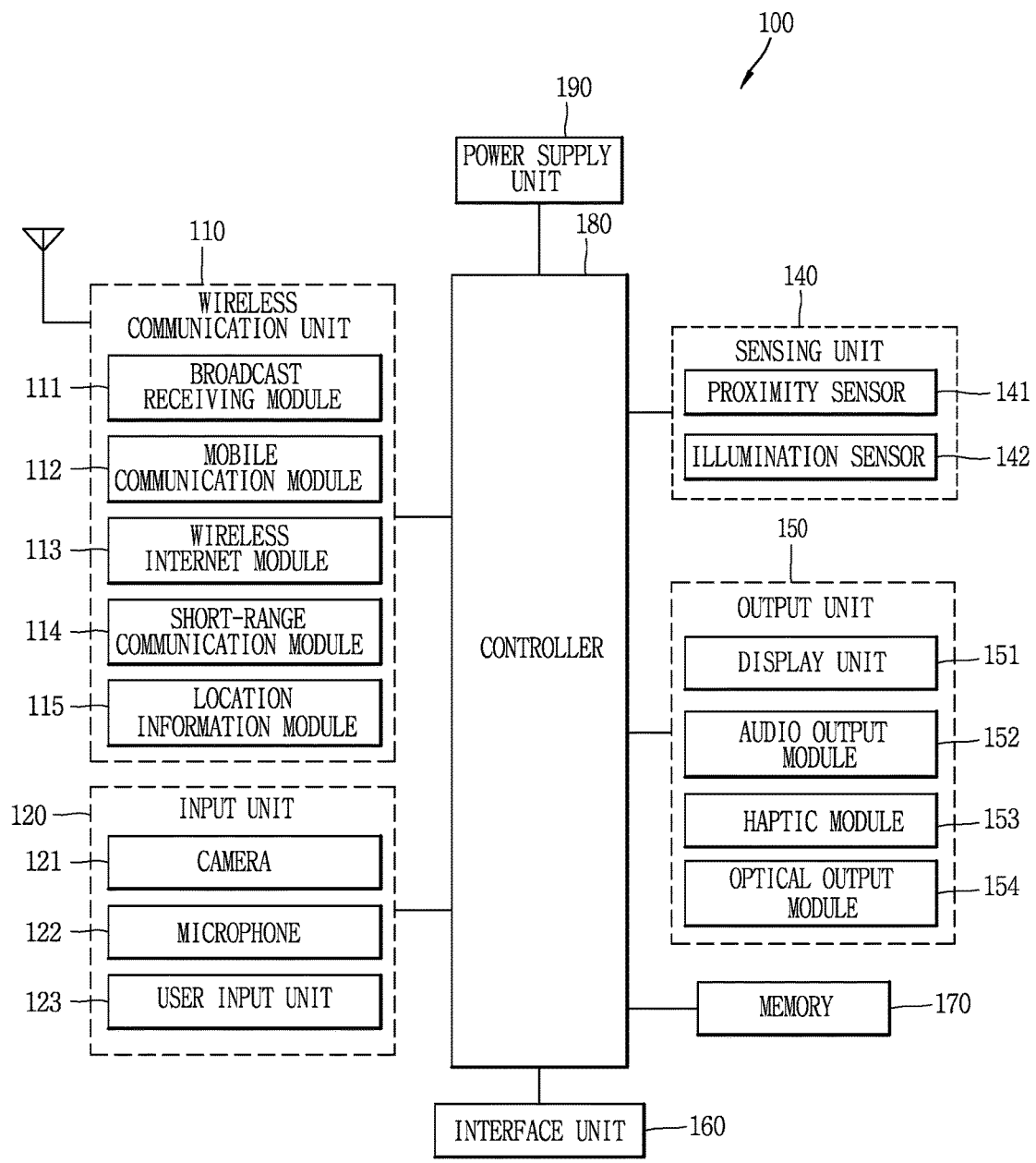
FIG. 1A is a block diagram of a mobile terminal in accordance with the present disclosure.
Figure 1B:
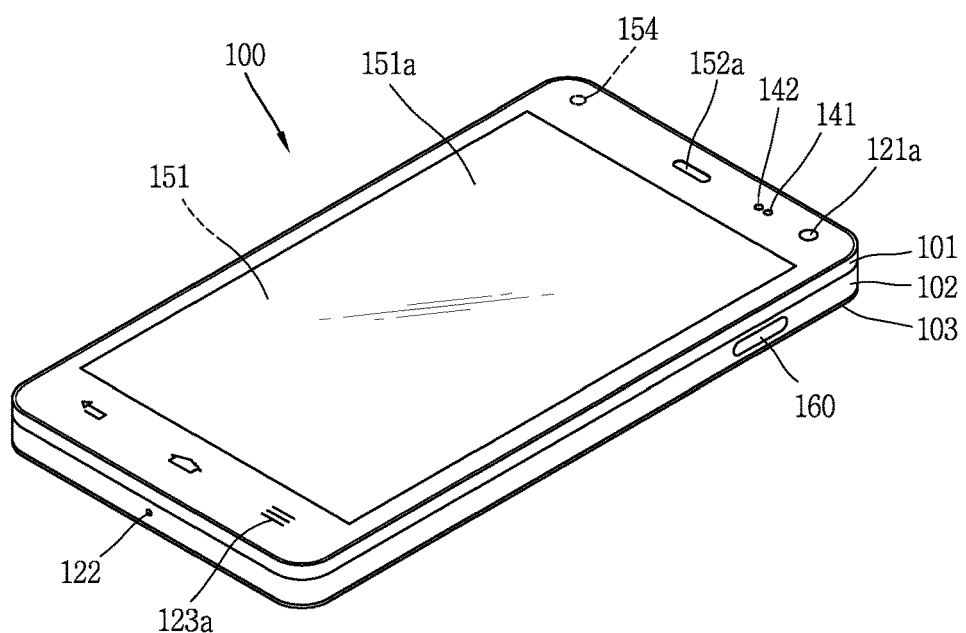
FIGS. 1B and 1C are conceptual views of one example of the mobile terminal, viewed from different directions.
Figure 1C:
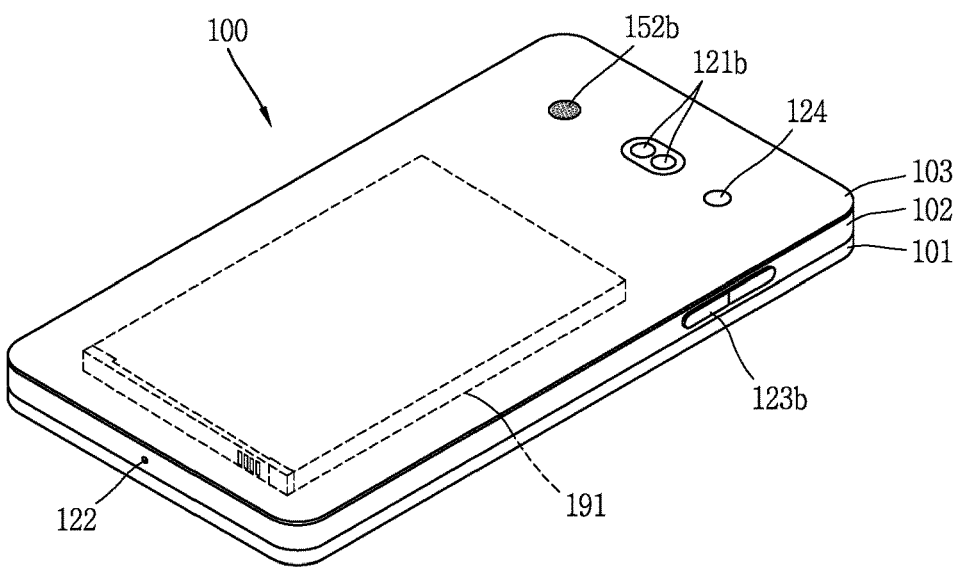

An embodiment of the present disclosure relates to a camera module 121*b* (please refer to FIG. 1C) used in the mobile terminal 100 and the mobile terminal 100 including the camera module 121*b*. That is, an embodiment of the present disclosure relates a dual camera installed in the mobile terminal 100. In FIG. 1C, the rear camera 121*b* is illustrated as a dual-camera, but the present disclosure is not limited thereto and may also be applied to the front camera 121*b*. Camera modules 200 and 300 described hereinafter may have the same configuration as that of the camera 121*b* of FIG. 1C. That is, the camera modules 200 and 300 are provided on a front side or a rear side of the mobile terminal 100.

Figure 2:
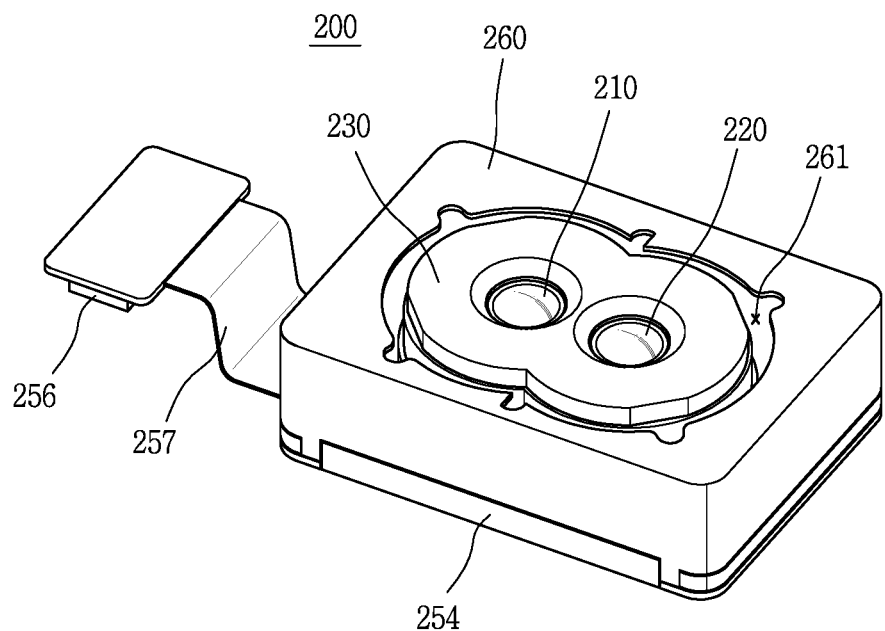
FIG. 2 is a perspective view of a camera module according to a first embodiment of the present disclosure.
Figure 3:
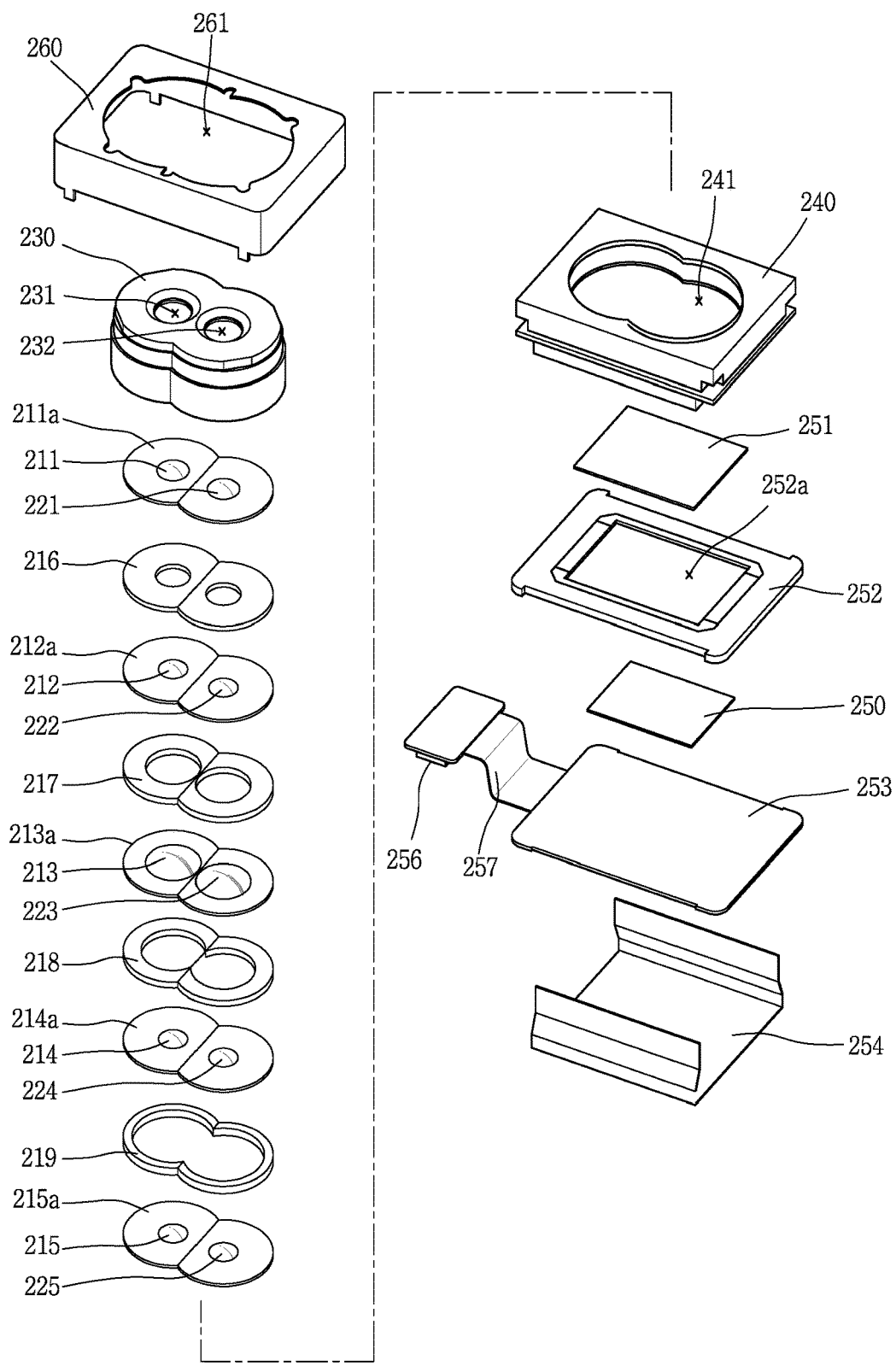
FIG. 3 is an exploded perspective view of a camera module according to the first embodiment of the present disclosure.
Figure 4:
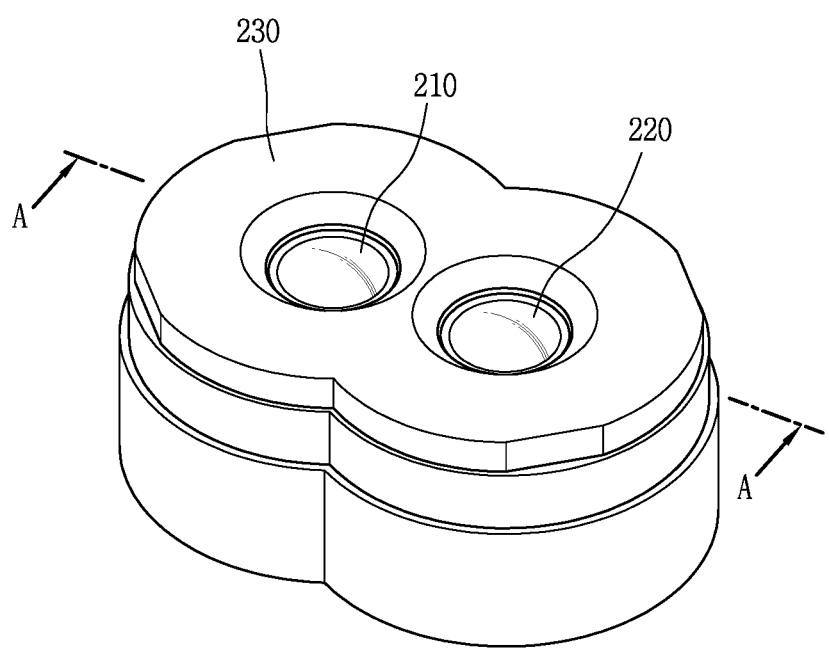
FIG. 4 is a perspective view of a case in which first and second lens assemblies are accommodated to the first embodiment of the present disclosure.
Figure 5A:
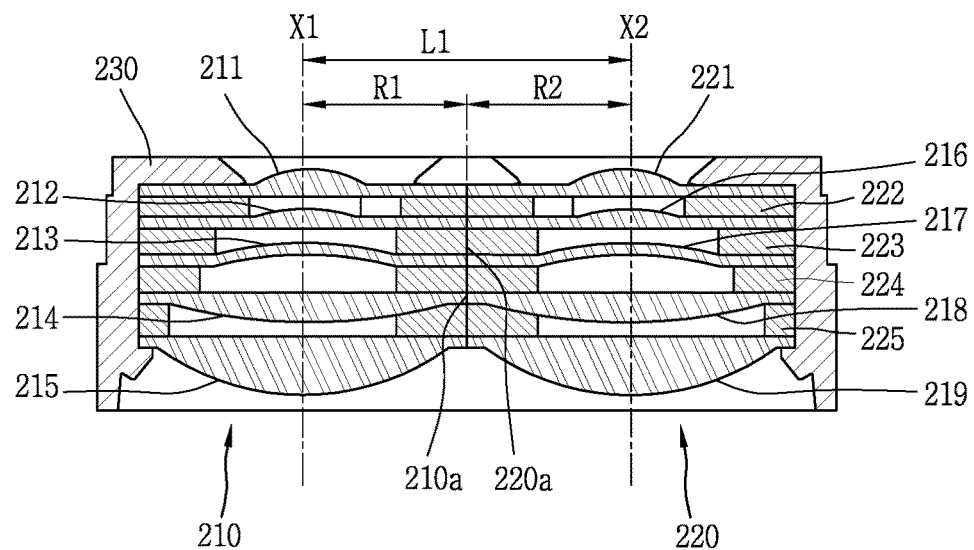
FIG. 5A is a cross-sectional view of a camera module according to a comparative example.
Figure 5B:
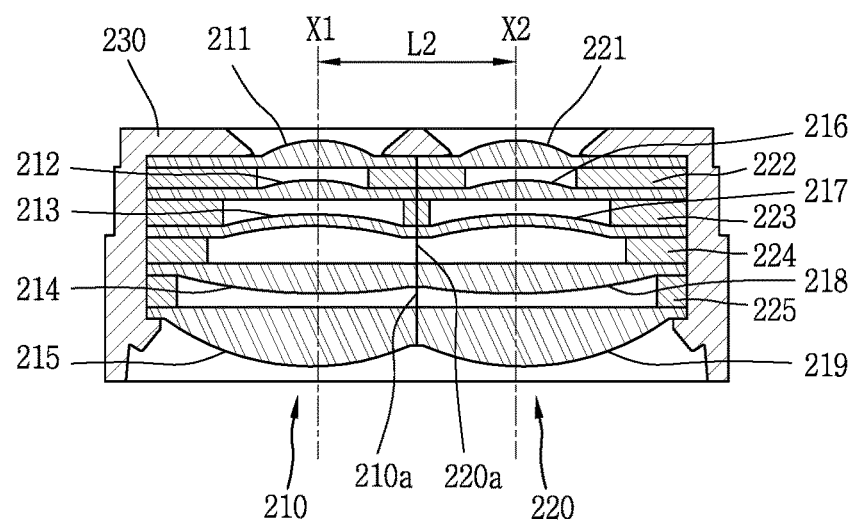
FIG. 5B is a cross-sectional view taken along line A-A of FIG. 4.
Figure 6:
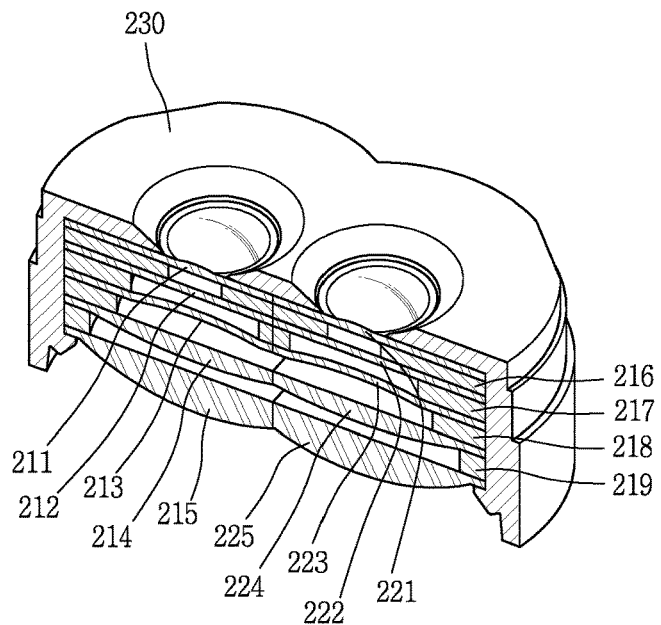
FIG. 6 is a perspective view of FIG. 5B.

FIG. 2 is a perspective view of the camera module 200 according to a first embodiment of the present disclosure, and FIG. 3 is an exploded perspective view of the camera module 200 according to the first embodiment of the present disclosure. FIG. 4 is a perspective view of a camera case 260 in a state in which first and second lens assemblies 210 and 220 according to the first embodiment of the present disclosure are accommodated, FIG. 5A is a cross-sectional view of a camera module according to a comparative example, FIG. 5B is a cross-sectional view taken along line A-A of FIG. 4, and FIG. 6 is a perspective view of FIG. 5B.

Hereinafter, the camera module 200 according to an embodiment of the present disclosure will be described with reference to FIGS. 2 to 6.

The camera module 200 according to an embodiment of the present disclosure relates to a dual camera including a pair of lens assemblies 210 and 220, and the pair of lens assemblies 210 and 220 may be a first lens assembly 210 and a second lens assembly 220. That is, the camera module 200 includes the first lens assembly 210 and the second lens assembly 220 disposed to be adjacent to the first lens assembly 210.

The first lens assembly 210 and the second lens assembly 220 may initially have a cylindrical shape and may be the same type of lens assemblies or may be different types of lens assemblies. For example, both the first lens assembly 210 and the second lens assembly 220 may be lens assemblies having a general field of view (FOV), or the first lens assembly 210 may be a lens assembly having a general FOV and the second lens assembly 220 may be a lens assembly having a wide angle. In addition, the first lens assembly 210 may be a lens assembly having a general FOV and the second lens assembly 220 may be a telephoto lens assembly.

Hereinafter, a case in which the first lens assembly 210 and the second lens assembly 220 are the same type of lens assemblies will be referred to as a first embodiment, and a case in which the first lens assembly 210 and the second lens assembly 220 are different types of lens assemblies will be referred to as a second embodiment.

First, the case in which the first lens assembly 210 and the second lens assembly 220 are the same type of lens assembly will be described. However, scope of the present disclosure is not limited thereto and matters applied to the first embodiment may also be applied to the second embodiment in the same manner, unless otherwise mentioned.

The camera module 200 includes a lens cover 230, an actuator 240, one image sensor 250, and a camera case 260. The lens cover 230 may have a pair of through holes 231 and 232 to allow the first and second lens assemblies 210 and 220 to be accommodated therein and making light incident to the first and second lens assemblies 210 and 220. For example, the lens cover 230 may have a first through hole 231 and a second through hole 232, and the first and the second through holes 231 and 232 are disposed to be spaced apart from each other at a predetermined interval.

The actuator 240 is disposed to be adjacent to the first and second lens assemblies 210 and 220 and serves to drive the first and second lens assemblies 210 and 220. That is, the actuator 240 serves as a driving unit for autofocusing (AF).

Also, the actuator 240 may include only one or two of the first and second lens assemblies 210 and 220. For example, in a case in which the first and second lens assemblies 210 and 220 are the same type, the actuator 240 may have a single structure. However, even when the first and second lens assemblies 210 and 220 have the same type, the actuator 240 may be separately divided into two assemblies 240a and 240 (please refer to FIG. 7) and the first actuator 240a may drive the first lens assembly 210 and the second actuator 240b may drive the second lens assembly 220. In particular, in a case in which the actuator 240 is a voice coil motor (VCM) type, the two actuators 240a and 240b may be used due to a weight of the VCM. An encoder scheme, a piezoelectric scheme, or a shape memory alloy (SMA) scheme may be applied to the actuator 240 and the present disclosure is not particularly limited.

Meanwhile, when the first and second lens assemblies 210 and 224 are different types as in a second embodiment, the actuator 240 should be separately formed as two actuators 240a and 240b.

In a case in which the first and second lens assemblies 210 and 220 are different, the first actuator 240a drives the first lens assembly 210 and the second actuator 240b drives the second lens assembly 220. That is, the first and second lens assemblies 210 and 220 are independently driven. This will be described hereinafter.

Here, the camera module according to an embodiment of the present disclosure includes one image sensor 250 for converting an optical signal incident through each of the first lens assembly 210 and the second lens assembly 220 into an image signal. Here, the image sensor 250 may be disposed below the first and second lens assemblies 210 and 220, and serve to convert an optical signal incident through the first lens assembly 210 and the second lens assembly 220 into a first image signal 250a and a second image signal 250b. As the image sensor 250, a charge coupled device (CCD) or a complementary metal oxide semiconductor (CMOS) may be used.

Figure 12:
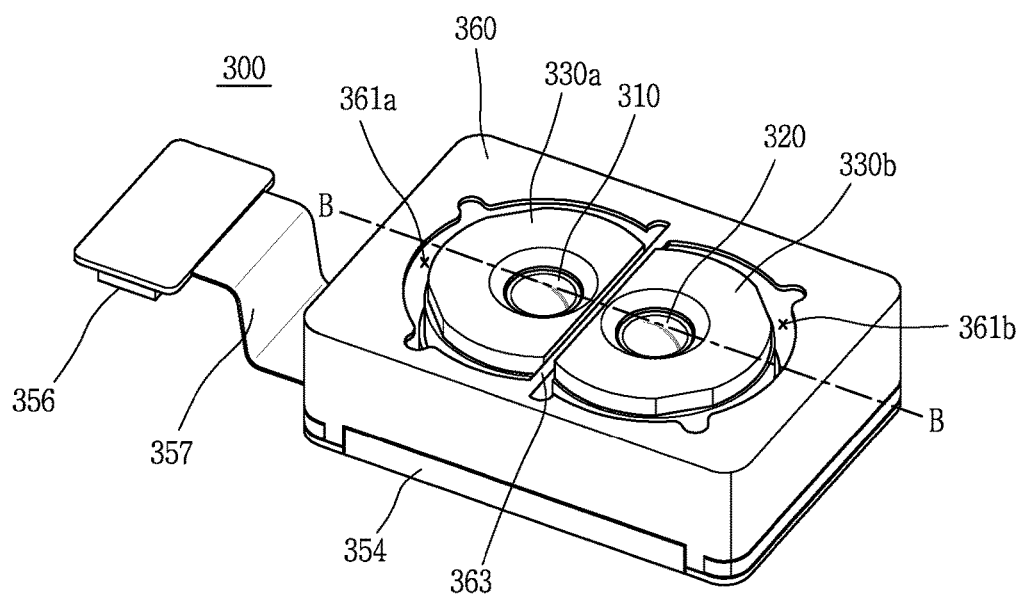
FIG. 12 is a perspective view of a camera module according to a second embodiment of the present disclosure.

Also, the camera case 260 is integrally formed, has a through hole formed on a front side of the camera case 260, and accommodates the first and second lens assemblies 210 and 220 such that light is incident to the first and second lens assemblies 210 and 220 through the through hole 261. The through hole 261 has a size for the lens cover 230 to be exposed outwardly through the through hole 261. In a case in which the first lens assembly 210 and the second lens assembly 220 are the same type, the through hole 261 is configured as a single hole. However, when the first lens assembly 310 and the second lens assembly 320 are different types, as illustrated in FIG. 12, the pair of through holes 361a and 361b are provided on the camera case 360 and partitioned by a partition 363 in a position corresponding to the first lens assembly 310 and the second lens assembly 320. This will be described in detail hereinafter.

As illustrated in FIGS. 3, 5B, and 6, in a case in which the first lens assembly 310 and the second lens assembly 320 are each comprised of five lenses, the first lens assembly 210 includes first to fifth lenses 211, 212, 213, 214, and 215, and first to fourth pads 216, 217, 218, and 219 are provided between the first to fifth lenses 211, 212, 213, 214, and 215. The first to fourth pads 216, 217, 218, and 219 serve to alleviate impact between the first to fifth lenses 211, 212, 213, 214, and 215, and separate the first to fifth lenses 211, 212, 213, 214, and 215 at a predetermined interval.

This is the same for the second lens assembly 220. Like the first lens assembly 210, the second lens assembly 220 includes first to fifth lenses 221, 222, 223, 224, and 225, and first to fourth pads 216, 217, 218, and 219 are provided between the first to fifth lenses 221, 222, 223, 224, and 225. The first to fourth pads 216, 217, 218, and 219 have a shape of the number of 8 or a roly poly.

The first to fourth pads 216, 217, 218, and 219 are disposed between the first to fifth lenses 211, 212, 213, 214, 215, 221, 222, 223, 224, and 225 of the first and second lens assemblies 210 and 220. Here, the first to fifth lenses 211, 212, 213, 214, and 215 of the first lens assembly 210 and the first to fifth lenses 221, 222, 223, 224, and 225 of the second lens assembly 220 are provided in the first to fifth support members 211a, 212a, 213a, 214a, and 2215a. For example, the first lens 211 of the first lens assembly 210 and the first lens 211 of the second lens assembly 220 are formed in the first support member 211a at a predetermined interval maintained therebetween, and the second to fifth lenses 212, 213, 214, and 215 of the first lens assembly 210 and the second to fifth lenses 212, 213, 214, and 215 of the second lens assembly 220 are formed in the second to fifth support members 212a, 213a, 214a, and 215a, like the first lenses 211 and 221. Here, among the plurality of lenses forming the first and second lens assemblies 210 and 220, lenses matched to each other may be integrally formed in the same support member and the first and second lens assemblies 210 and 220 may be simultaneously moved.

The first to fourth pads 216, 217, 218, and 219 have an appearance corresponding to the first to fifth support members 211a, 212a, 213a, 214a, and 215a, and the first to fourth pads 216, 217, 218, and 219 and the first to fifth support members 211a, 212a, 213a, 214a, and 215a have a shape corresponding to a cross-section of the lens cover 230. Here, the first to fifth lenses 211, 212, 213, 214, and 215 may have the same size or may have different sizes according to degrees to which they are convex or concave. In this case, however, preferably, appearances of the first to fifth support members have the same shape.

The first to fifth lenses 211, 212, 213, 214, 215, 221, 222, 223, 224, and 225 and the first to fourth pads 216, 217, 218, and 219 may be sequentially stacked, and the lens cover 230 may have a height sufficient for accommodating the first and second lens assemblies 210 and 220.

The first lens assembly 210 and the second lens assembly 220 are covered by the lens cover 230, and the first lens assembly 210 and the second lens assembly 220 are disposed within the actuator 240 having the through hole 241.

Also, an infrared ray cut filter (IRCF) is disposed below the actuator 240 to block an infrared ray of light incident through the first and second lens assemblies 210 and 220 and allow only visible light to be transmitted therethrough. The IRCF 251 may be coupled to the sensor base 252. For example, the IRCF 251 may be attached to a lower surface or an upper surface of the sensor base 252. The sensor base 252 also has a through hole 252a formed at the center therein.

In this manner, the through holes 261, 231, 232, 241, and 252a are formed in the camera case 260, the lens cover 230, the actuator 240, and the sensor base 252 to allow light incident from a subject to be incident to the image sensor 250 disposed below the sensor base 252.

The image sensor 250 convert an optical signal incident through the first and second lens assemblies 210 and 220 into an image signal (or an image). In an embodiment of the present disclosure, only a single image sensor 250 forming an image signal by two optical signals incident through the pair of lens assemblies 210 and 220 is provided. This will be described hereinafter.

The image sensor 250 is connected to a circuit board 253, and the circuit board 253 is connected to a flexible printed circuit board (FPCB) 257 so as to be electrically connected to a main circuit board within the mobile terminal 100 by a connector 256. The circuit board 253 is covered by an insulating tape 254 and electrically blocked from the outside. That is, the circuit board 253 is provided below the image sensor 250, and the circuit board 253 and the image sensor 250 are electrically connected. Also, one end portion of the FPCB 257 is connected to the circuit board 253, and the connector 256 is formed at the other end of the FPCB 257.

Meanwhile, the first and second lens assemblies 210 and 220 have a shape of the number 8 or a roly poly. When the first and second lens assemblies 210 and 220 are separately formed, the circular first and second lens assemblies are disposed to be adjacent to each other and combined in a form in which an overlap partial region (a segment) is removed.

In this manner, in an embodiment of the present disclosure, as a portion of the mutually adjacent region is cut, the first lens assembly 210 has a first cut surface 210a and the second lens assembly 220 has a second cut surface 220a. The first and second cut surfaces 210a and 220a may be disposed to be in contact with each other or spaced apart from each other at a predetermined interval so as to face each other. The first embodiment of the present disclosure relates to the former and the second embodiment relates to the latter, but the present disclosure is not limited thereto.

The first lens assembly 210 has the first cut surface 210a and the second lens assembly 220 has the second cut surface 220a. The first and second cut surfaces 210a and 220a are disposed to face each other. That is, when the first and second lens assemblies 210 and 220 are the same type, the first lens assembly 210 may be formed to face each other in line symmetry. The first and second lens assemblies 210 and 220 are D-shaped cut and portions forming the cut surfaces are attached to face each other. Here, the first and second cut surfaces 210a and 220a are surfaces forming a boundary of the first and second lens assemblies 210 and 220, and thus, the first and second cut surfaces 210a and 220a may be termed first and second boundaries.

However, the first cut surface 210a and the second cut surface 220a are merely examples to facilitate understanding of the present disclosure and it may not mean that portions of the first lens assembly 210 and the second lens assembly 220 are cut. For example, in a case in which the first lens assembly 210 and the second lens assembly 220 are simultaneously manufactured, the first lens assembly 210 and the second lens assembly 220 may be integrally formed. In detail, the lenses 211, 212, 213, 214, 215, 221, 222, 223, 224, and 225 forming the first and second lens assemblies 210 and 220 may be coupled to the support members 211a, 212a, 213a, 214a, and 215a. In this case, the first cut surface 210a and the second cut surface 220a are not visible by naked eyes and it may be understood that there is a virtual cut surface on a boundary line of the first lens assembly 210 and the second lens assembly 220. In this case, however, the first and second lens assemblies 210 and 220 should be simultaneously moved.

Figure 7:
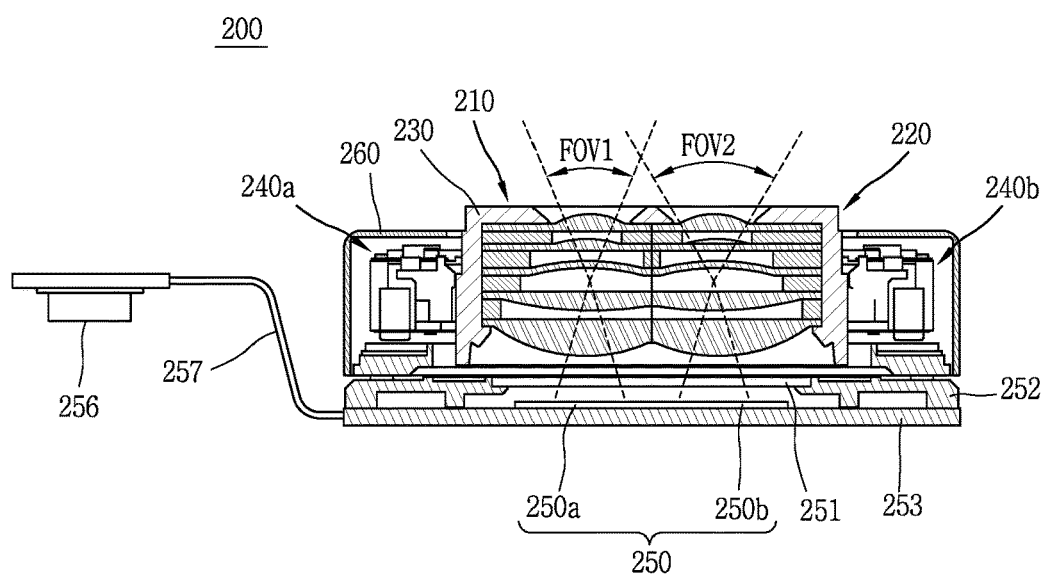
FIG. 7 is a cross-sectional view of a camera module according to a first embodiment of the present invention.

FIG. 7 is a cross-sectional view of the camera module 200 according to an embodiment of the present invention, in which the first and second lens assemblies 210 and 220 of FIG. 4 are covered by the camera case 260.

Figure 8A:
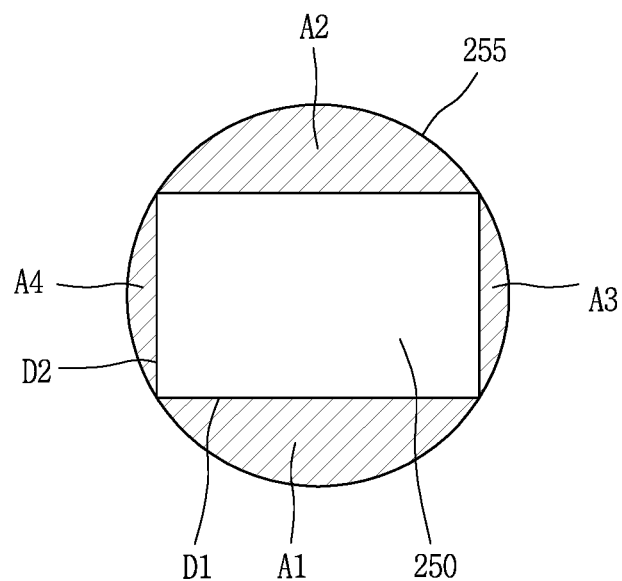
FIG. 8A is a conceptual view illustrating a general image sensor and an image circle.
Figure 8B:
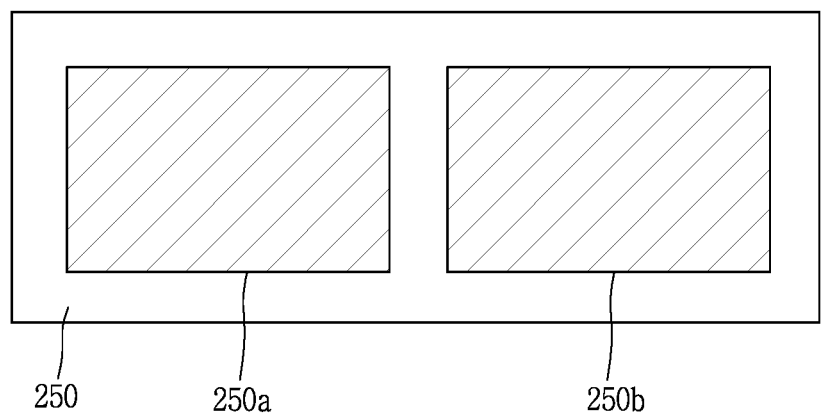
FIG. 8B is a conceptual view illustrating an image sensor and first and second images according to an embodiment of the present disclosure.

FIG. 8A is a conceptual view illustrating a general image sensor 250 and an image circle 255, and FIG. 8B is a conceptual view illustrating the image sensor 250 and first and second images 250a and 250b according to an embodiment of the present disclosure.

The general image sensor 250 has a rectangular shape in which a ratio of the length and the width is 4:3 or 16:9. The image sensor 250 has a rectangular shape as illustrated in FIG. 8A. Here, the circle refers to the image circle 255. For example, light is incident to an inner region of the image circle 255 through the lens assembly, and the rectangular inner region of the internal region of the image circle 25 is imaged by the image sensor 250. In this manner, when the image sensor 250 has a rectangular shape, it has a longer side D1 and a shorter side D2, and outer regions A1, A2, A3, and A4 of the image sensor 250 in the inner region of the image circle 255 is not imaged but discarded. Here, the image circle 255 refers to an entire image formed on an image formation surface through the circular lens assembly.

In FIG. 8A, it is assumed that the entire image formed on the image sensor 250 (the rectangular inner region) is a valid image, and a region within a pair of longer sides D1 facing each other will be referred to as a vertical angle of view and a region within a pair of shorter sides D2 will be referred to as a horizontal angle of view.

Here, regions discarded, rather than being imaged by the image sensor 250, may be distinguished as outer regions A3 and A4 of the horizontal angle of view and outer regions A1 and A2 of the vertical angle of view, and it can be seen that the outer regions A3 and A4 of the vertical angle of view are larger than the outer regions A1 and A2 of the horizontal angle of view.

An embodiment of the present disclosure uses this phenomenon. That is, portions of the discarded regions A1, A2, A3, and A4 are D-cut such that the first lens assembly 210 and the second lens assembly 220 are disposed to be adjacent to each other. Here, the image sensor 250 has a rectangular shape having the longer side D1 and the shorter side D2, and the first and second cut surfaces 210a and 220a may be surfaces cut to be adjacent to the longer side D1 or the shorter side D2 of the rectangular shape. As illustrated in FIG. 8A, since the outer region of the longer side D1 is larger than the outer region of the shorter side D2, it is advantageous to cut to be adjacent to the longer side D1. Thus, the first and second lens assemblies 210 and 220 have a D shape and the first and second lens assemblies 210 and 220 have a shape of the number of 8 or a roly poly. Also, the cut portion has a D shape. That is, the cut portion corresponds to a small segment portion of the circle and a remaining portion corresponds to a large segment portion of the circle.

Referring back to FIGS. 5 to 7, when an image formed on the image sensor 250 by the first lens assembly 210 is a first image 250a and an image formed on the image sensor 250 by the second lens assembly 220 is a second image 250b, the first image 250a and the second image 250b are formed to be adjacent to each other. Also, since the first image 250a and the second image 250b have a mutually overlap viewing angle, as a distance L2 between a first optical axis X1 as an optical axis of the first lens assembly 210 and a second optical axis X2 as an optical axis of the second lens assembly is closer, overlap portion of the first image 250a and the second image 250b is increased.

Here, in FIG. 5, the first and second lens assemblies 210 and 220 are disposed to be parallel to each other without a cut region, and a distance between the first and second optical axes X1 and X2 is L1. The distance L1 between the optical axes may be the sum of a radius R1 of a body tube of the first lens assembly 210 and a radius R2 of a body tube of the second lens assembly 220. However, according to an embodiment of the present disclosure, as illustrated in FIG. 5B, a distance L2 between optical axes is smaller than the distance L1 between the optical axes of the comparative example. That is, since a portion of adjacent regions of the first and second lens assemblies 210 and 220 is cut, the distance L2 between the first and second optical axes X1 and X2 is reduced.

In this manner, in an embodiment of the present disclosure, the volume of the camera module 200 mounted in the mobile terminal 100 is reduced by reducing the distance between the optical axes.

In an embodiment of the present disclosure, the first image 250a formed by the first lens assembly 210 and the second image 250b formed by the second lens assembly 220 are cropped to form a single image. In this case, a subject may be more accurately implemented by the portion in which the first image 250 and the second image 250b overlap.

Here, since the first image 250a and the second image 250b are simultaneously formed, an operation of synchronizing time axes or a synchronization time may be reduced in synthesizing the first image 250a and the second image 250b. In this manner, in an embodiment of the present disclosure, there is little difference in time when the first image 250a and the second image 250b are formed, simplifying the process of forming a single image.

The related art dual camera has a structure having two lenses and two sensors. Thus, in order to align angles of view and imaging regions of both lenses, a bottom plate is formed using a zinc alloy to align them or a partition 363 is formed between modules and assembled. In this case, calibration is required to secure depth resolution by reviewing a time axis alignment and disparity between optical axes.

Also, when an image is synthesized, white balance or autofocusing conditions are different due to independent structure of each camera, requiring synchronization. That is, when an image is received from each camera, since image views are different, a synchronization operation is required.

Meanwhile, in an embodiment of the present invention, since the image is an image of the same image sensor 250, an additional structure (partition, bracket) is not required for structural alignment or optical axis alignment, and a calibration operation is not required for disparity between optical axes, shortening the process. Also, since one image sensor 250 is provided, it is basically synchronized, and thus, there is no difference between images when images are synthesized.

Here, an angle of view of the first and second lens assemblies 210 and 220 is a general angle, a wide angle may be implemented by synthesizing an image. For example, when an angle of view of the first and second lens assemblies 210 and 220 is 80°, an image having an angle of view of 130° may be implemented by synthesizing images by the first and second lens assemblies 210 and 220.

Here, a field of view (FOV) of the single image is adjusted to be smaller than the sum of a first FOV FOV1 of the first lens assembly 210 and a second FOV FOV2 of the second lens assembly 220. If the FOV of the synthesized single image is equal to the sum of the first FOV FOV1 of the first lens assembly 210 and the second FOV FOV2 of the second lens assembly 220, the first image 250a and the second 250b do not overlap, making it difficult to synthesize a single image. For example, in a case in which the first and second FOVs is 80°, when an end portion of the first image 250a and an end portion of the second image 250b adjacent to the end portion of the first image 250a are connected to each other, the first image 250a and the second image 250b may be connected to synthesize a single image, but it is actually difficult to synchronize an image having a FOV of 160° due to an image distortion phenomenon that occurs in the edges of the first image 250a and the second image 250b.

Thus, in an embodiment of the present disclosure, the distance L2 between the first optical axis X1 of the first lens assembly 210 and the second optical axis X2 of the second lens assembly 220 is limited to be smaller than a preset size. In an embodiment of the present disclosure, the distance between the first optical axis X1 and the second optical axis X2 may be termed a base line. As the base line L2 is increased, a size of FOV based on synthesis of the first and second lens assemblies 210 and 220 is increased, and as the base line L2 is reduced, a portion in which the first image 250a and the second image 250b overlap is increased to reduce a size of the FOV of the single image.

The case in which the first and second lens assemblies 210 and 220 are the same type has been described. Hereinafter, a case in which first and second lens assemblies 310 and 320 are different types will be described.

Figure 9A:
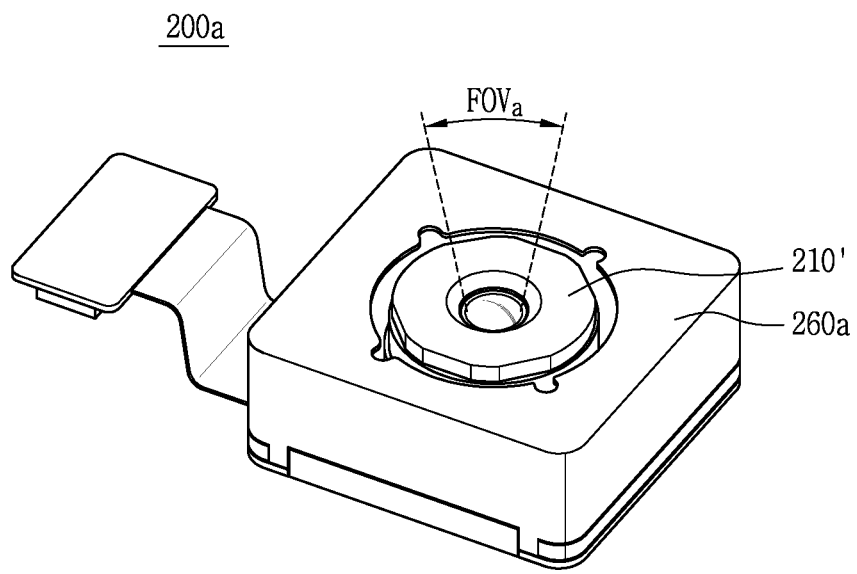
FIG. 9A is a view illustrating a camera module having a general field of view (FOV)
Figure 9B:
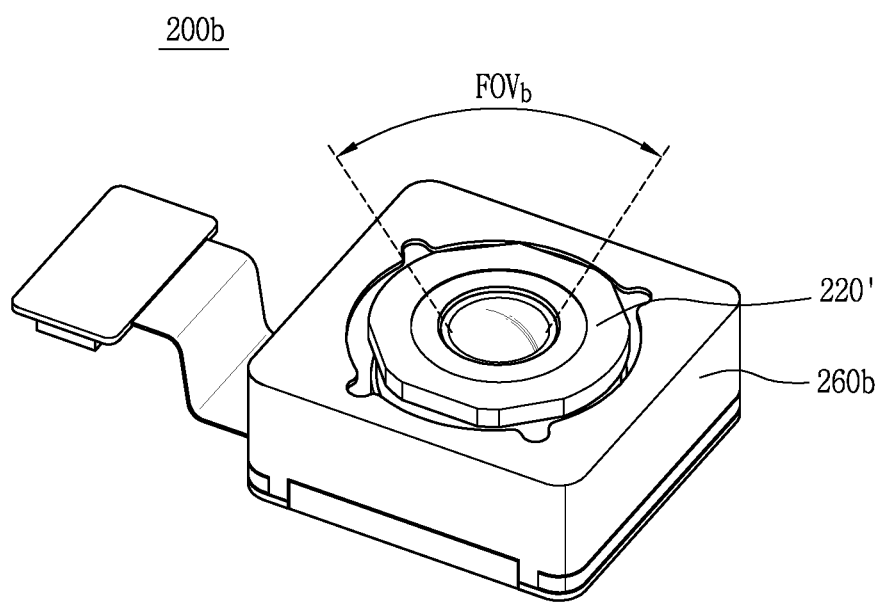
FIG. 9B is a view illustrating a camera module having a wide angle.
Figure 10:
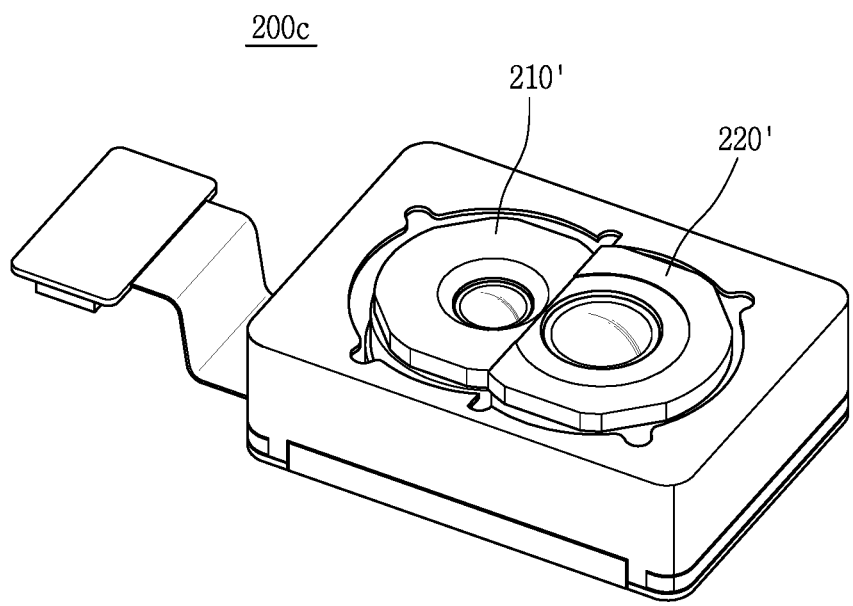
FIG. 10 is a view illustrating an example in which the camera modules illustrated in FIGS. 9A and 9B are manufactured as a single camera module.
Figure 11:
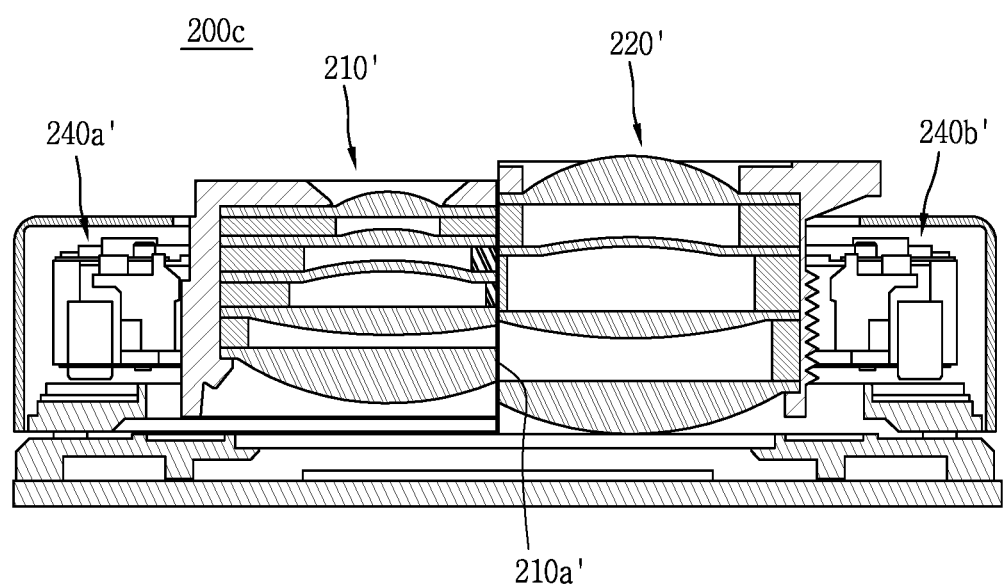
FIG. 11 is a cross-sectional view of FIG. 10.

FIG. 9A is a view illustrating a camera module 200a having a general field of view (FOV), and FIG. 9B is a view illustrating a camera module 200b having a wide angle. FIG. 10 is a view illustrating an example in which the camera modules illustrated in FIGS. 9A and 9B are manufactured as a single camera module 200c, and FIG. 11 is a cross-sectional view of FIG. 10.

Referring to FIGS. 9A to 11, a problem arising when the different types of camera modules 200a and 200b respectively having a general angle (FOVa) and a wide angle (FOVb) are configured in such a manner as in the first embodiment may be recognized.

A lens assembly 210' of the camera module 200a having the general angle of view FOVa will be referred to as a first lens assembly and a lens assembly 220' of the camera module 200b having the wide angle FOVb will be referred to as a second lens assembly. When the sizes of the first and second lens assemblies 210' and 220' are similar, the lens assemblies 210' and 220' may be D-cut as illustrated in FIG. 10 and the lens assemblies 210' and 220' may have a common cut surface 210a'. Here, actuators 240a' and 240b' respectively driving the lens assemblies 210' and 220' are provided. Here, degrees to which the lens assemblies 210' and 220' protrude forwards are different and frictional contact may occur in the cut surface 210a', a partition 363 is provided as illustrated in FIG. 12.

Figure 13:
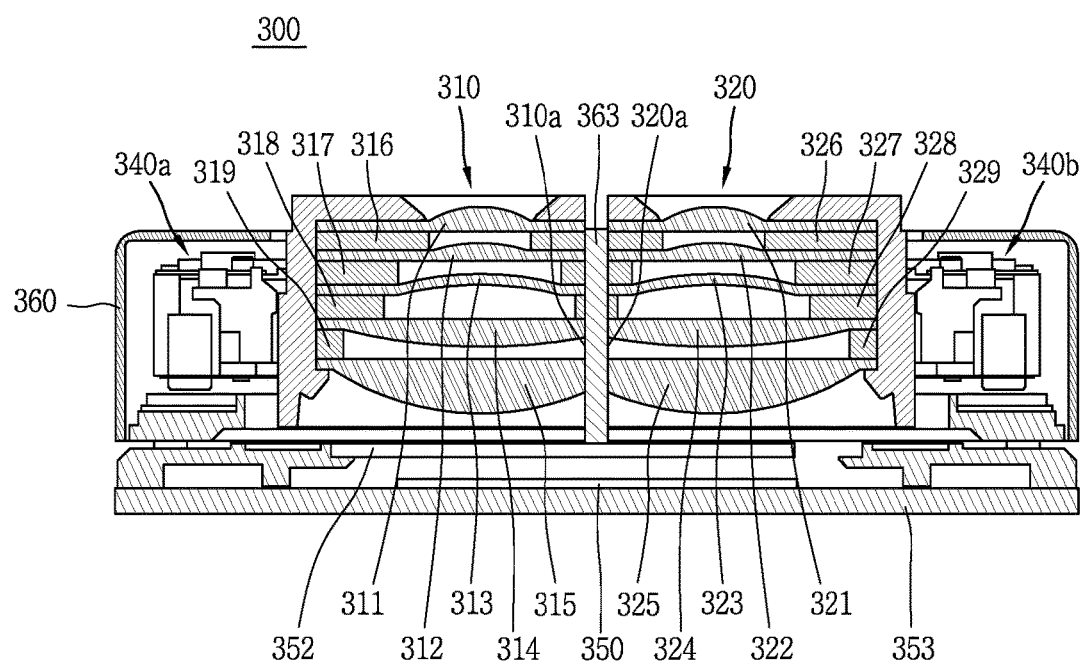
FIG. 13 is a cross-sectional view taken along line B-B of FIG. 12.
Figure 14:
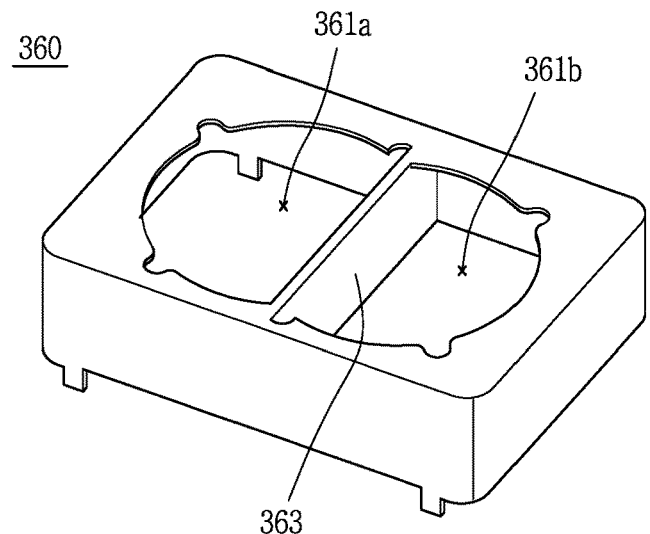
FIG. 14 is a perspective view of a case according to the second embodiment of the present disclosure.

FIG. 12 is a perspective view of a camera module according to a second embodiment of the present disclosure, FIG. 13 is a cross-sectional view taken along line B-B of FIG. 12, and FIG. 14 is a perspective view of a case according to the second embodiment of the present disclosure. Hereinafter, the second embodiment of the present disclosure will be described with reference to FIGS. 12 to 14.

In the second embodiment, a case in which the first lens assembly 210 has a first cut surface 210a, the second lens assembly 220 has a second cut surface 220a, and the first and second cut surfaces 210a and 220a are spaced apart from each other and face each other will be described. That is, in the second embodiment of the present disclosure, the partition 363 is provided between the first lens assembly 310 and the second lens assembly 320 such that the first and second cut surfaces 210a and 220a are spaced apart from each other at a predetermined interval. That is, when the first and second lens assemblies 310 and 320 are different as in the second embodiment, in the camera case 360, the partition 363 is provided to divide the through hole 261 of the first embodiment into a third through hole 361a and a fourth through hole 361b, and the first and second lens assemblies 310 and 320 are exposed to the outside through the third and fourth through holes 361a and 361b, respectively. The partition 363 serves to divide the interior of the camera case 360. The partition 363 extends from an upper surface of the camera case 360 downwardly to spatially divide the first lens assembly 310 and the second lens assembly 320. The first lens assembly 310 and the second lens assembly 320 may be D-cut. D-cutting does not affect conversion of an image signal based on the first and second lens assemblies 310 and 320.

In the second embodiment, the cut portion has a D shape, like in the first embodiment. That is, the cut portion corresponds to a small segment portion of a circle, and the other remaining portion corresponds to a large segment portion of the circle.

Here, compared with the first embodiment in which the first and second lens assemblies 210 and 220 are the general FOV, in the second embodiment of the present disclosure, the first lens assembly 310 may have a general FOV and the second lens assembly 320 may be a lens assembly for wide angle capturing. In addition, in the second embodiment, the first lens assembly 310 may have a general FOV and the second lens assembly 320 may be a lens assembly for telephoto lens. In a case in which the second lens assembly 320 is a wide angle and telephoto lens, it is larger than a lens assembly having a general FOV, so a size or a height of the camera module 300 is determined by a wide angle or telephoto lens assembly.

Also, in the second embodiment of the present disclosure, the actuators 340a and 340b include a first actuator 340a disposed to be adjacent to the first lens assembly 310 to drive the first lens assembly 310 and a second actuator 340b disposed to be adjacent to the second lens assembly 320 to drive the second lens assembly 320. The first and second actuators 340a and 340b are formed on one side of the first lens cover 330a and the second lens cover 330b, respectively.

In this manner, in the second embodiment of the present disclosure, the first and second lens assemblies 310 and 320 are spatially separately formed and the lens covers 330a and 330b accommodating the first and second lens assemblies 310 and 320 are also formed as two separate lens covers.

The first lens assembly 310 includes first to fifth lenses 311, 312, 313, 314, and 315 and first to fourth pads 316, 317, 318, and 319 disposed between the first to fifth lenses 311, 312, 313, 314, and 315.

That is, like the first embodiment described above, in the second embodiment, when the first lens assembly 310 and the second lens assembly 320 include five lenses, the first lens assembly 310 includes first to fifth lenses 311, 312, 313, 314, and 315 and the first to fourth pads 316, 317, 318, and 319 are provided between the first to fifth lenses 311, 312, 313, 314, and 315. The first to fourth pads 316, 317, 318, and 319 alleviate impact between the first to fifth lenses 311, 312, 313, 314, and 315, and separate the first to fifth lenses 311, 312, 313, 314, and 315 at a predetermined interval.

This is the same as in the case of the second lens assembly 320. Like the first lens assembly 310, the second lens assembly 320 includes first to fifth lenses 321, 322, 323, 324, and 325, and fifth to eighth pads 326, 327, 328, and 329 are provided between the first to fifth lenses 321, 322, 323, 324, and 325. The first to eighth pads 316, 317, 318, 319, 326, 327, 328, and 329 have a D shape. The first to eighth pads 316, 317, 318, 319, 326, 327, 328, and 329 are disposed between the first to fifth lenses 311, 312, 313, 314, 315, 321, 322, 323, 324, and 325 of the first and second lens assemblies 310 and 320.

However, in the second embodiment, the camera case 360 is integrally formed, an IRCF 351, a sensor base 352, an image sensor 350, and a circuit board 353 are disposed below the first and second lens assemblies 310 and 320, and the circuit board 353 is electrically connected to a main circuit board (not shown) within the mobile terminal by a connector 356 formed in an FPCB 357.

The partition 363 is formed in a middle point of the camera case 360 in a vertical direction of the camera case 360, and downwardly extends to a formation position of the at least fifth lenses 315 and 325.

Also, in the first embodiment of the present disclosure, the first to fifth lenses 211, 212, 213, 214, and 215 of the first lens assembly 210 and the first to fifth lenses 221, 222, 223, 224, and 225 of the second lens assembly 220 are formed together with the first to fifth support members 211*a*, 212*a*, 213*a*, 214*a*, and 215*a*. However, in the second embodiment of the present disclosure, the first to fifth lenses 311, 312, 313, 314, and 315 of the first lens assembly 310 and the first to fifth lenses 321, 322, 323, 324, and 325 of the second lens assembly 320 are separately formed.

Also, the first and second lens assemblies 310 and 320 are independently operated by the first and second actuators 340*a* and 340*b*. In the first embodiment, the pair of actuators 240*a* and 240*b* are provided, but in the second embodiment, since the first and second lens assemblies 310 and 320 are different types, two actuators 340*a* and 340*b* should be necessarily provided.

Also, in the second embodiment, an encoder scheme, a piezoelectric scheme, or a shape memory alloy (SMA) scheme, in addition to a voice coil motor (VCM) scheme, may be applied to the actuators 340*a* and 340*b* and the present disclosure is not particularly limited.

A portion in which the first lens assembly 310 and the partition 363 are in contact with each other is a first cut surface 310*a*, and a portion in which the second lens assembly 320 and the partition 363 are in contact with each other is a second cut surface 320*a*. The first and second cut surfaces are formed on both sides of the partition 363 in a facing manner.

Also, in the second embodiment, an optical signal incident through the first and second lens assemblies 310 and 320 is converted into an image signal by a single image sensor 350, and since the single image sensor 350 is provided, time according to time axis correction may be reduced.

In the above, descriptions regarding the same parts as those of the first embodiment are mostly omitted, and the content described in the first embodiment may also be applied to the second embodiment. Also, in the second embodiment, the first and second lens assemblies 310 and 320 are different types, but the present disclosure may also be applied in the same manner even when the first and second lens assemblies 310 and 320 are the same type of lens assemblies. In this case, the actuators 340*a* and 340*b* may be configured as a single actuator.

As in the second embodiment of the present disclosure, when the first and second lens assemblies 310 and 320 are different types, for example, when the first lens assembly 310 is a lens assembly for imaging a general field of view and the second lens assembly 320 is a lens assembly for imaging a wide angle of view, the wide angle image obtained by the second lens assembly 320 may include an image of a general angle of view obtained by the first lens assembly 310. In this case, an image conversion mode may be set and any one image may be selected in a preview state, and two images such as a picture-in-picture may be simultaneously displayed. This the same when the first lens assembly 310 is a lens assembly for imaging a general angle of view, and the second lens assembly 320 is a lens assembly for telephoto.

Also, in the first and second embodiments, when the first and second lens assemblies 210, 220, 310, and 320 re simultaneously used, images are simultaneously formed in the image sensors 250 and 350, and when the first and second lens assemblies 210, 220, 310, and 320 are separately used, the image sensors 250 and 350 may be entirely used an a portion in which an image is formed may be cropped to be used.

In an embodiment of the present disclosure, two images are processed, while using only a single image sensor. As this processing scheme, a method in which two images are cut and processed before image signal processing (ISP) and a method in which one image is ISP-processed and cut and used before image processing.

In the former method, ISP of one path is utilized, in which two images are discriminately input to each memory and ISP is driven at a rate of 2 times or greater to process an image. Also, when ISP of two paths is utilized, two images are discriminately input to each memory and respectively input to the ISP of the two paths.

Also, in the latter method, in a case in which ISP of one path is utilized, after an ISP image is processed, an image stored in a memory may be discriminated by software.

Meanwhile, in the above, the case in which two lens assemblies are provided has been described. However, the present disclosure is not limited thereto and a plurality of lens assemblies may also be provided. For example, three or four lens assemblies may be provided.

Figure 15:
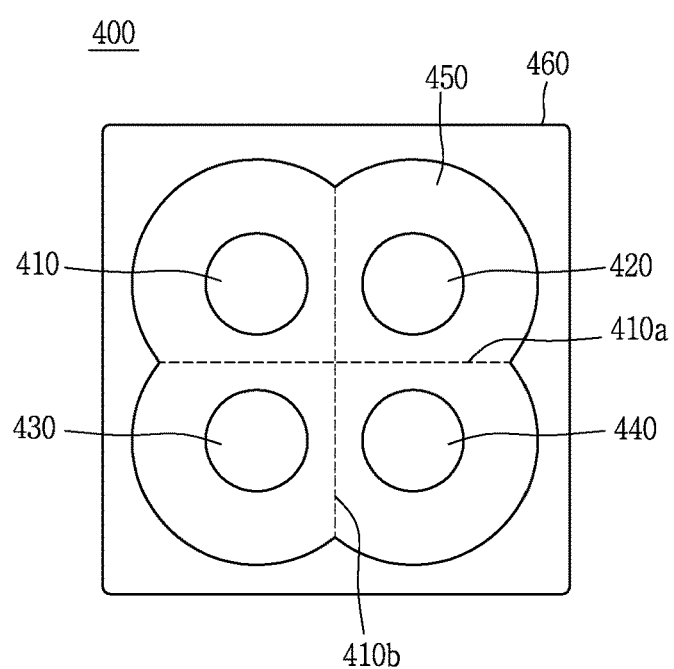
FIGS. 15 to 17 are conceptual views illustrating a camera module according to an embodiment of the present disclosure.
Figure 16:
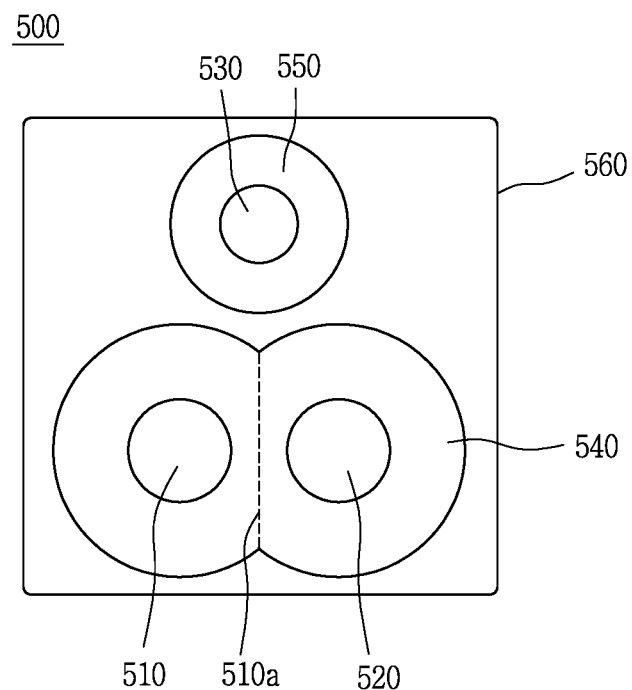
Figure 17:
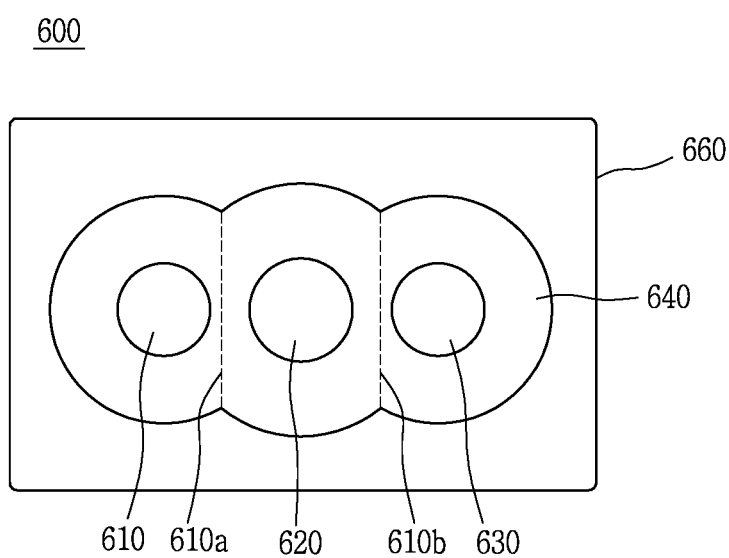

FIGS. 15 to 17 are views conceptually illustrating a camera module according to an embodiment of the present disclosure. The camera module will be described with reference to FIGS. 15 to 17.

First, referring to FIG. 15, a camera module 400 may include first to fourth lens assemblies 410, 420, 430, and 440 and may be disposed in a 2×2 form. The first to fourth lens assemblies 410, 420, 430, and 440 are accommodated in a lens cover 450, and the lens cover 450 is accommodated in a camera case 460. The first to fourth lens assemblies 410, 420, 430, and 440 are accommodated in the lens cover 450 having a quadrant shape, and may be divided by cut surfaces 410*a* and 410*b*. Here, the cut surfaces 410*a* and 410*b* may be surfaces in contact with each other as in the first embodiment, or may be surfaces divided by a partition as in the second embodiment. That is, when the first to fourth lens assemblies 410, 420, 430, and 440 are the same, the cut surfaces 410*a* and 410*b* may be surfaces in contact with each other, and when the first to fourth lens assemblies 410, 420, 430, and 440 are different, the cut surfaces 410*a* and 410*b* may be partitions. Referring to FIG. 16, a camera module 500 includes first to third lens assemblies 510, 520, and 530, and the first to third lens assemblies 510, 520, and 530 are accommodated in a camera case 560. The first and second lens assemblies 510 and 520 are accommodated in a lens cover 540 and the third lens assembly is accommodated in a lens cover 550.

The first and second lens assemblies 510 and 520 may be the first and second lens assemblies 210, 220, 310, and 320 of the camera module 200 and 300 in the first embodiment or the second embodiment. Also, the third lens assembly 530 is a lens assembly spatially separated from the first and second lens assemblies 510 and 520 and independently driven from the first and second lens assemblies 510 and 520. Here, a cut surface 510*a* may also be formed between the first and second lens assemblies 510 and 520, and the cut surface 510*a* may be a surface or a partition in contact with the mutually adjacent lens assemblies 510 and 520.

Also, referring to FIG. 17, a camera module 600 may include first to third lens assemblies 610, 620, and 630. The first to third lens assemblies 610, 620, and 630 are accommodated in a lens cover 640, and the lens cover 640 is accommodated in a camera case 660. The first to third lens assemblies 610, 620, and 630 may be divided by a first cut surface 610a and a second cut surface 610b. Here, the first cut surface 610a and the second cut surface 610b may be a surface or a partition in which the first to third lens assemblies 610, 620, and 630 are in contact with each other.

Here, the first and second cut surfaces 610a and 610b may correspond to a longer side D1 of FIG. 8A facing each other. In other words, when only the second lens assembly 620 is considered, the first and second cut surfaces 610a and 610b are formed in portions adjacent to the longer side D1 in FIG. 8A.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A camera module comprising:
a first lens assembly;
a second lens assembly disposed to be adjacent to the first lens assembly;
a lens cover accommodating the first and second lens assemblies and having first and second through holes allowing light to be incident to the first and second lens assemblies;
an actuator provided on one side of the first and second lens assemblies to drive the first and second lens assemblies;
one image sensor disposed below the first and second lens assemblies and converting light signals incident through the first and second lens assemblies into first and second image signals; and
a camera case having a through hole formed on a front side thereof and accommodating the lens cover to allow light to be incident to the first and second lens assemblies through the through hole,
wherein portions of mutually adjacent regions of the first and second lens assemblies are cut so that the first lens assembly has a first cut surface and the second lens assembly has a second cut surface,
wherein the first and second cut surfaces are in contact with each other or spaced apart from each other at a predetermined interval and disposed to face each other,
wherein the lens cover includes a first lens cover and a second lens cover which are D-shaped and disposed to face each other, and
wherein the first and second lens assemblies are inserted and arranged in the first and second through holes so as to have a predetermined gap between the circular lenses included in the first and second lens assemblies.

2. The camera module of claim 1, wherein when configurations of the first and second lens assemblies are the same, the first and second cut surfaces are in contact with each other.

3. The camera module of claim 2, wherein the actuator is one actuator or two actuators.

4. The camera module of claim 1, wherein when configurations of the first and second lens assemblies are different, the first and second cut surfaces are spaced apart from each other at a predetermined interval and disposed to face each other, a partition is formed in the camera case to divide the through hole into a third through hole and a fourth through hole, and the first and second lens assemblies are exposed outwardly through the third and fourth through holes.

5. The camera module of claim 4, wherein the actuator includes:
a first actuator disposed to be adjacent to the first lens assembly to drive the first lens assembly; and
a second actuator disposed to be adjacent to the second lens assembly to drive the second lens assembly.

6. The camera module of claim 1, wherein the image sensor has a rectangular shape with a longer side and a shorter side, and the first and second cut surfaces are surfaces formed to be adjacent to at least one of the longer side and the shorter side of the rectangular shape.

7. The camera module of claim 1, wherein the first and second lens assemblies have a D shape.

8. The camera module of claim 1, wherein the first image signal and the second image signal are cropped to synthesize a single image.

9. The camera module of claim 8, wherein a distance between an optical axis of the first lens assembly and an optical axis of the second lens assembly is smaller than a preset size.

10. The camera module of claim 8, wherein a field of view (FOV) of the single image is smaller than the sum of a first FOV of the first lens assembly and a second FOV of the second lens assembly.

11. The camera module of claim 1, wherein the lens cover has a single structure.

12. The camera module of claim 1, further comprising:
a circuit board provided below the image sensor and electrically connected to the image sensor; and
a flexible circuit board having one end portion connected to the circuit board and the other end portion in which a connector is formed.

13. A mobile terminal comprising:
a terminal body; and
a camera module formed on one surface of the terminal body,
wherein the camera module comprises:
a plurality of lens assemblies disposed to be adjacent to each other;
a lens cover accommodating the plurality of lens assemblies and having through holes allowing light to be incident to the plurality of lens assemblies;
an actuator provided on one side of the plurality of lens assemblies to drive the plurality of lens assemblies;
one image sensor disposed below the plurality of lens assemblies and converting light signals incident through the plurality of lens assemblies into image signals; and
a camera case having a through hole formed on a front side thereof and accommodating the lens cover to allow light to be incident to the plurality of lens assemblies through the through hole,
wherein portions of mutually adjacent regions of the plurality of lens assemblies are cut so that the plurality of lens assemblies each have a cut surface,
wherein the cut surfaces are in contact with each other or spaced apart from each other at a predetermined interval and disposed to face each other,
wherein the lens cover includes a first lens cover and a second lens cover which are D-shaped and disposed to face each other, and
wherein the first and second lens assemblies are inserted and arranged in the first and second through holes so as to have a predetermined gap between the circular lenses included in the first and second lens assemblies.

14. The mobile terminal of claim 13, wherein when configurations of the plurality of lens assemblies are the same, the cut surfaces are in contact with each other.

15. The mobile terminal of claim 13, wherein when configurations of the plurality of lens assemblies are different, the cut surfaces are spaced apart from each other at a predetermined interval and disposed to face each other and a partition may be formed in the camera case to divide the interior thereof.

16. The mobile terminal of claim 13, wherein the image sensor has a rectangular shape with a longer side and a shorter side, and the cut surfaces are surfaces formed to be adjacent to at least one of the longer side and the shorter side of the rectangular shape.

17. The mobile terminal of claim 16, wherein the cut surfaces are formed to be adjacent to the longer sides facing each other.

18. The mobile terminal of claim 13, wherein the actuator is one or more actuators.

19. The mobile terminal of claim 18, wherein when the actuator is provided in plurality, the plurality of actuators independently operate.

20. The mobile terminal of claim 13, wherein each of the lens assemblies has a D shape or a quadrant shape.

* * * * *